United States Patent Office 3,304,181
Patented Feb. 14, 1967

3,304,181
PHOTOGRAPHIC MATERIALS FOR THE SILVER DYESTUFF BLEACHING PROCESS
Walter Anderau, Aesch, Switzerland, assignor to Ciba Limited, Basel, Switzerland, a company of Switzerland
No Drawing. Filed Mar. 29, 1963, Ser. No. 269,199
Claims priority, application Switzerland, Apr. 10, 1962, 4,367/62
8 Claims. (Cl. 96—99)

In substractive photographic processes for the production of colored transparencies and images viewed in incident light, there is required a blue component color image the blue dyestuff of which exhibits an absorption maximum in the range between 600 an 640 m$\mu$. The dyestuff should be as transparent as possible in the range between 400 and 500 m$\mu$. It must also be possible to bleach out the said blue dyestuffs in the conventional silver dyestuff bleaching baths, depending on the amount of metallic silver present, without a change in tint occurring at the various color densities. The completely bleached portions of the image must be colorless and the sensitivity of the silver halide must not be substantially diminished. Furthermore, the dyestuffs must be non-diffusing or must be capable of being rendered non-diffusing with precipitation agents and, particularly in the case of images viewed in incident light, they should display a high degree of light fastness.

This invention is based on the observation that these requirements are particularly well met by certain disazo dyestuffs prepared from a tetrazotized 3:3'-dicarboxyalkoxy-4:4'-diamino-diphenyl. The present invention thus provides photographic materials for the silver dyestuff bleaching process that contain on a support a layer having at least one dyestuff of the formula (1) $\quad R_1\text{—}N\text{=}N\text{—}D\text{—}N\text{=}N\text{—}R_2$ in which D represents a diphenyl radical bound to the azo groups in 4-position and 4'-position, which radical contains a carboxy-alkoxy group in 3-position and a carboxy-alkoxy group in 3'-position, $R_1$ represents the radical of a 1-amino-8-hydroxynaphthalene sulfonic acid bound to the azo group in 7-position, and $R_2$ represents a hydroxynaphthalene radical bound to the azo group in a position vicinal to the hydroxyl group, the dyestuff molecule containing at least 2 sulfonic acid groups, or a complex heavy-metal compound of such a dyestuff.

Dyestuffs of the Formula 1, some of which are known, are obtained by coupling the tetrazo compound of a 4:4'-diamino-diphenyl that is further substituted in 3-position and 3'-position by carboxyalkoxy groups, for example, carboxy-propoxy groups, but advantageously carboxy-methoxy groups (—O—CH$_2$—COOH), with an azo component of the formula $R_1$—H and with an azo component of the Formula H—$R_2$, in which $R_1$ and $R_2$ have the meanings given above. Depending on the choice of azo components, there can be obtained asymmetrical or preferably symmetrical disazo dyestuffs.

As diamine of the formula $H_2N$—D—$NH_2$ to be used in the preparation of the tetrazo compound there is advantageously chosen 3:3' - di-carboxymethoxy - 4:4'-diaminodiphenyl of the formula (2) 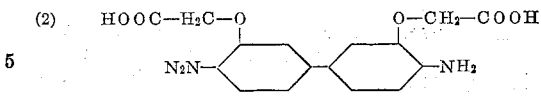

However, there can also be used diamines that are further substituted in the benzene nuclei, for example, those containing chlorine atoms or methyl groups.

The tetrazo compound is coupled on at least one side with a 1-amino-8-hydroxynaphthalene sulfonic acid that contains a free ($H_2N$—) or a further substituted amino group, for example, an acylamino group derived from a carboxylic acid group or a sulfonic acid group, and that may contain just one, but advantageously contains two, sulfonic acid groups. As examples there may be mentioned 1-amino-8-hydroxynaphthalene-3:6-, 4:6-, -2:4- and -3:5-disulfonic acid and the corresponding 1-acetylamino-, 1-benzoylamino-, and 1-para-toluene sulfonylamino-8-hydroxynaphthalene disulfonic acids, and also 1-amino-8-hydroxynaphthalene-4-sulfonic acid and 1-amino-8-hydroxynaphthalene-5-sulfonic acid.

Asymmetrical disazo dyestuffs are prepared by coupling the tetrazo compounds either with two different 1-amino-8-hydroxynaphthalene sulfonic acids or with a 1-amino-8-hydroxynaphthalene sulfonic acid and another hydroxynaphthalene compound that can be coupled in a position vicinal to the hydroxy group. The following compounds are examples:

2-hydroxynaphthalenes such as 2-hydroxynaphthalene itself or 2-hydroxy-6-methoxynaphthalene, 2-hydroxynaphthalene-3-carboxylic acid or a 2-hydroxynaphthalene-3-carboxylic acid arylamide, 1-hydroxynaphthalenes that couple in 2-position such as 1-hydroxy-4-methylnaphthalene and 1-hydroxy-5:8-dichloronaphthalene, hydroxynaphthalene sulfonic acids that couple in a position vicinal to the hydroxyl group such as 1-hydroxynaphthalene-4- or -5-sulfonic acid, 2-hydroxynaphthalene-4-, -5-, -6-, -7- or -8-sulfonic acid, 1-hydroxynaphthalene-3:6- or -3:8-disulfonic acid, 2-hydroxynaphthalene-3:6- or 6:8-disulfonic acid, 1:8-dihydroxynaphthalene-3:6-disulfonic acid, 1-hydroxy-8-methoxynaphthalene-3:6-disulfonic acid and 1-hydroxy-8-chloronaphthalene-3:6 disulfonic acid.

As has already been mentioned, the two azo components should contain together at least 2 sulfonic acid groups. Coupling is advantageously carried out in an alkaline medium; in any case it must be carried out in such manner that the amino-hydroxynaphthalene sulfonic acids do not couple in a position vicinal to the amino group, but in a position vicinal to the hydroxy group. Thus, coupling is generally carried out with advantage in the presence of sodium bicarbonate, sodium carbonate or sodium borate, if desired (especially to complete the coupling operation in the formation of a disazo dyestuff), in the presence of agents that assist coupling, for example, pyridine bases such as picoline or pyridine itself.

By suitable choice of the said azo components it is possible to fix the absorption maximum at substantially any wavelength within the range of from 580 and 700 m$\mu$, and thereby obtain especially pure tints.

Dyestuffs that are especially suitable for forming photographic materials according to the present invention are those of the following compositions:

(a) Dyestuffs of the formula

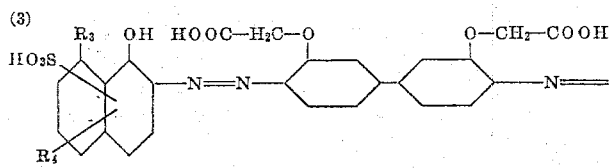 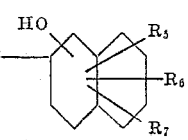

in which $R_3$ represents the $H_2N-$ group or an acylamino group, $R_4$ represents a hydrogen atom or a sulfonic acid group, $R_5$ represents a hydrogen atom or the $H_2N-$ group or an acylamino group or a hydroxyl group or an alkoxy group, and $R_6$ and $R_7$ represents hydrogen atoms or sulfonic acid groups (for example, $R_6$ represents a sulfonic acid group and $R_7$ represents a hydrogen atom), the dyestuff molecule containing at least 2 sulfonic acid groups.

(b) Dyestuffs of this composition that correspond to the formula

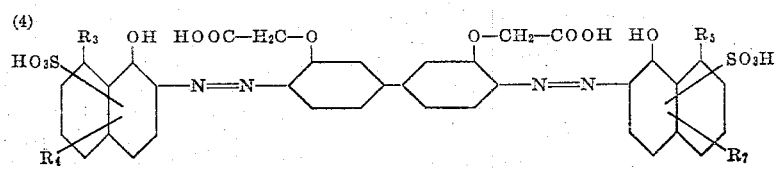 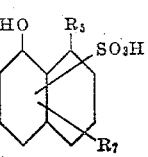

in which $R_3$ represents the $H_2N-$ group or a phenylamino group that may be further substituted or an acylamino group (for example, an acetyl- or propionyl-amino group or a benzoylamino group that can contain further substituents in the benzene nucleus such as methyl groups or chlorine atoms, or a benzene sulfonylamino group or a para-toluene sulfonylamino group) $R_5$ represents a hydrogen atom or, like $R_3$, the $H_2N-$ group or a phenylamino group that may be further substituted or an acylamino group or it may represent a hydroxyl or alkoxy group (for example, an ethoxy or methoxy group), and $R_4$ and $R_7$ represent hydrogen atoms or sulfonic acid groups.

(c) Dyestuffs of the composition given under (b) that correspond to the formula

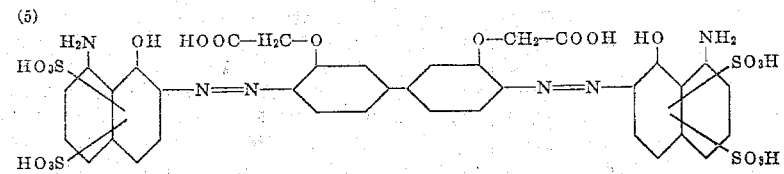 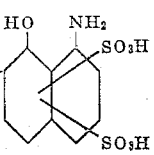

and that may be asymmetrical but are preferably symmetrical.

The known deystuffs that are to be incorporated in the photographic layers of the invention are virtually of no practical use in textile dyeing. Their eminent suitability as dyestuffs for photographic layers in material to be subjected to the silver dyestuff bleaching process is surprising. They lend themselves very well to bleaching out, and what was not anticipated, without change in tint, which is in contrast to dyestuffs obtained by the two-sided coupling of tetrazotized 3:3'-dimethoxy-4:4'-diaminodiphenyl with 1-amino-8-hydroxynaphthalene sulfonic acids. These latter dyestuffs turn markedly reddish when bleached to a low color density.

The fastness to light of the aforesaid dyestuffs to be used in preparing photographic material according to the present invention is not, in itself, very high, but it can be substantially improved by treating the said dyestuffs with agents yielding nickel or copper to form metal complex compounds.

The tints of the complex nickel or copper compounds so obtained and incorporated in layers of photographic material are generally a very pure blue to green blue, thus being free from undesirable absorption bands.

The aforesaid metal-free dyestuffs can advantageously be converted into the said metal-complex compounds, preferably the copper-complex compounds, in the gelatine layer before exposure. If no excess of copper is present that is to say, if the process is carried out in such a manner that all the copper participates in the formation of a copper-complex with the dyestuff, the sensitivity to light of the silver halide is not diminished. As a rule, the complex copper compounds of the dyestuffs are completely non-diffusing.

It is also known to prevent the diffusion of azo dyestuffs in photographic layers by means of organic bases, for example, with the aid of diphenylbiguanide of the formula $$C_6H_5-NH-C(=NH)-NH-C(=NH)-NH-C_6H_5$$

or 1:1:3-triphenylguanidine of the formula $$HN=C(-NH-C_6H_5)-N(-C_6H_5)_2$$

However, this measure can impair the fastness to light. The dyestuffs to be used in preparing photographic material according to the present invention can likewise be rendered non-diffusing with said organic bases but without impairing their high degree of light fastness when, in the finished image, the dyestuff is after-treated with a dilute weakly acid to weakly alkaline solution (pH between 3.5 and 9.5) of a nickel or copper-yielding agent. To this end, it is sufficient to treat the image, for example, with an aqueous solution of crystallized copper sulfate of 1 to 3% strength. Instead of copper sulfate, there can also be used other copper-yielding agents such as copper chloride or copper acetate or complex copper compounds prepared, for example, from glycocoll, tartaric acid, citric acid or salicylic acid. It is advantageous to wash the images for a few minutes in water after the treatment with the said metal yielding agent.

The complex metal compounds of the dyestuffs can also be prepared in substance and, since they are generally very sparingly soluble in water, brought to a very fine state of division, the particles advantageously being smaller than $5\mu$, and then introduced into the layers in this form.

If, in the production of the image, the layer having metal containing dyestuffs therein is subjected to a treatment in a strongly acid medium, for example, the usual bleaching of the residual silver with a solution of copper sulfate and potassium bromide made strongly acidic with hydrochloric acid, the metal-containing dyestuffs are at least partially de-metallized. In such a case, it is highly advantageous to carry out an after-treatment with a metal-yielding agent in a weakly acid to weakly alkaline medium.

Unless otherwise stated, the parts and percentages in the following preparation instructions and examples are by weight.

(7)

8-hydroxynaphthalene-4:6-disulfonic acid in the form of the sodium salt are dissolved in 700 parts of water, 20 parts of sodium acetate and 30 parts of sodium bicarbonate are added and likewise dissolved. The tetrazo compound is buffered to the pH-value of 6 with sodium acetate and is then added quickly, at 0 to 4° C., to the azo component solution. The formation of the monoazo dyestuff is complete after 5 to 20 minutes. 33 parts of 1-amino-8-hydroxynaphthalene-2:4-disulfonic acid dissolved in 300 parts of water are then added in the presence of 30 parts of anhydrous sodium carbonate and 30 parts of a picoline. The formation of the asymmetrical disazo dyestuff is completed rapidly. The dyestuff of the formula

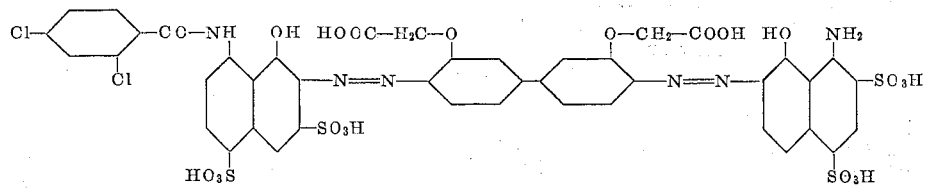

PREPARATION INSTRUCTIONS FOR DYESTUFFS

A. 33.2 parts of the 3:3'-di-carboxymethoxy-4:4'-diaminodiphenyl of the formula (6)

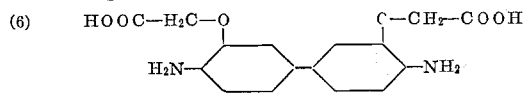

in the form of the disodium salt are dissolved in 600 parts of water, 14 parts of sodium nitrite are added and the mixture is cooled with ice to 0 to 1° C. 70 parts of hydrochloric acid of 30% strength are added all at once and the mixture is stirred for some time. In the meantime, 49.2 parts of 1-(2':4'-dihclorobenzoylamino)- can be precipitated with sodium chloride. It is purified by recrystallization and then dried. The dyestuff so obtained is reddish blue and its complex copper compound is blue.

In the following tables there are listed further dyestuffs that are obtainable by coupling tetrazotized 3:3'-dicarboxymethoxy-4:4'-diaminodiphenyl with the given azo components. In the case of the symmetrical dyestuffs (Table I) the tetrazo compound can also be coupled with the 1-amino-8-hydroxynaphthalene sulfonic acid in one operation with the addition of picoline in a medium made alkaline with sodium carbonate.

TABLE I.—SYMMETRICAL DYESTUFFS

| No. | Azo Component | Tint | | |
|---|---|---|---|---|
| | | Metal Free | Cu Compound | Ni Compound |
| 1 | 1-amino-8-hydroxynaphthalene-3:6-disulfonic acid | Blue | Green-blue | Blue. |
| 2 | 1-amino-8-hydroxynaphthalene-2:4-disulfonic acid | do | Blue-green | Do. |
| 3 | 1-amino-8-hydroxynaphthalene-4-sulfonic acid | do | do | Do. |
| 4 | 1-amino-8-hydroxynaphthalene-4:6-disulfonic acid | do | Green-blue | Do. |
| 5 | 1-amino-8-hydroxynaphthalene-3:5-disulfonic acid | Reddish-blue | Reddish-blue | Reddish-blue. |
| 6 | 1-para-toluene sulfonylamino-8-hydroxynaphthalene-3:6-disulfonic acid. | Blue | Blue | Blue. |
| 7 | 1-benzoylamino-8-hydroxynaphthalene-3:6-disulfonic acid. | do | do | Do. |
| 8 | 1-acetylamino-8-hydroxynaphthalene-3:6-disulfonic acid. | do | do | Do. |
| 9 | 1-acetylamino-8-hydroxynaphthalene-4-sulfonic acid | do | do | Do. |
| 10 | 2-(2':4'-dichlorobenzoylamino)-8-hydroxynaphthalene-4:6-disulfonic acid. | do | Green-blue | Do. |
| 11 | 1-phenylamino-8-hydroxynaphthalene-4:6-disulfonic acid. | do | do | Do. |
| 12 | 1-cyclohexylamino-8-hydroxynaphthalene-4:6-disulfonic acid. | do | do | Do. |

TABLE II.—ASYMMETRICAL DYESTUFFS

| No | 1st Azo component | 2nd Azo component | Tint | |
|---|---|---|---|---|
| | | | Metal Free | Cu compound |
| 13 | 1-amino-8-hydroxynaphthalene-3:6-disulfonic acid. | 1-(2':4'-dichlorobenzoylamino)-8-hydroxynaphthalene-4:6-disulfonic acid. | Reddish blue | Blue. |
| 14 | 1-hydroxynaphthalene-3:8-disulfonic acid | 1-amino-8-hydroxynaphthalene-2:4-disulfonic acid. | do | Reddish blue. |
| 15 | 1-amino-8-hydroxynaphthalene-4-sulfonic acid. | 1-acetylamino-8-hydroxynaphthalene-3:6-disulfonic acid. | Blue | Greenish blue. |
| 16 | 1-hydroxy-8-ethoxynaphthalene-3:6-disulfonic acid. | 1-amino-8-hydroxynaphthalene-4-sulfonic acid. | do | Blue. |
| 17 | 1-amino-8-hydroxynaphthalene-3:6-disulfonic acid. | 1-cyclohexylamino-8-hydroxynaphthalene-4:6-disulfonic acid. | do | Green-blue. |

B. 33.2 parts of the 3:3′-dicarboxymethoxy-4:4′-diamino-diphenyl of the Formula 6 in the form of the disodium salt are dissolved in 600 parts of water, 14 parts of sodium nitrite are added and the mixture is cooled with ice to 0 to 1° C. 70 parts of hydrochloric acid of 30% strength are then added all at once and the mixture is stirred for some time. There is obtained a clear yellow solution of the tetrazo compound the pH value of which is adjusted to 6 with sodium acetate shortly before coupling. In the meantime 33 parts of 1-amino-8-hydroxynapthalene-2:4-disulfonic acid are dissolved in 700 parts of water in the presence of sodium carbonate to produce a neutral reaction, 10 parts of crystallized sodium acetate and 40 parts of sodium bicarbonate, and the temperature is depressed to 4° C. with ice. The tetrazo compound is added to the solution of the azo component. The mononazo dyestuff forms in the course of 15 to 20 minutes. The solution of the second coupling component obtained by dissolving 16.5 parts of 2-hydroxynaphthalene-3-carboxylic acid phenyl-amide and 10 parts of picoline in 40 parts of dimethylformamide and 80 parts of ammonia of 15% strength is then added. The disazo dyestuff of the formula (8)
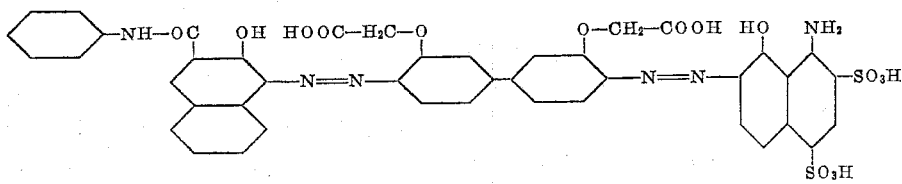

is quickly found and can be completely precipitated by the addition of a small amount of a sodium chloride solution; it is then filtered.

When incorporated in the gelatine it yields a blue that is easily bleachable and completely non-diffusing. When it is in the form of a complex copper compound it exhibits a high degree of light fastness.

By replacing the 16.5 parts of 2-hydroxynaphthalene-3-carboxylic acid phenylamide by 19 parts of 2-hydroxynaphthalene-3-carboxylic acid-4′-chlorophenylamide, there is obtained a similar dyestuff that yields a somewhat more greenish blue.

By replacing the 2-hydroxynaphthalene-3-carboxylic acidphenyl amide by 39.5 parts of 1-phenyl-amino-8-hydroxynaphthalene-4:6-disulfonic acid there is obtained a greenish blue dyestuff that is non-diffusing and that exhibits a high degree of light fastness when in the form of a complex copper compound.

C. 36 parts of the 3:3′-dicarboxypropoxy-4:4′-diaminodiphenyl of the formula (9)
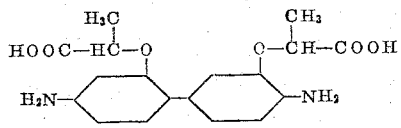

in the form of the sodium salt are dissolved in 600 parts of water, 14 parts of sodium nitrite are added and the mixture is cooled with ice to 0 to 1° C. 70 parts of hydrochloric acid of 30% strength are then added quickly and the mixture is stirred for some time.

The yellow solution of the tetrazo compound is added to the solution of the azo component that is obtained when 64 parts of 1-amino-8-hydroxynaphthalene-3:6-disulfonic acid have been dissolved in 800 parts of water in the presence of 80 parts of anhydrous sodium carbonate and the solution is cooled to 2° C. The formation of the dyestuff can be assisted by the addition of 20 parts of pyridine or picoline. The dyestuff is precipitated from the solution with sodium chloride after 2 hours and it is then filtered. It colours gelatine a neutral blue tint, and a non-diffusing dyeing is obtained by the addition of a precipitating agent, the amount used being the same as that of the dyestuff. As precipitating agent there can be used an aqueous solution of diphenyl-biguanide acetate or a reaction product of dicyanodiamidine and formaldehyde. When the blue image produced by the silver dyestuff bleaching process is aftertreated with copper, a greenish blue tint of a high fastness to light is obtained.

Example 1

40 parts of a gelatine solution having a temperature of 40° C. and that contains 10 parts of solid gelatine in 100 parts of water are mixed with 10 parts of a 1% aqueous solution of dyestuff No. 1 of Table I. The dyestuff solution is well stirred. 5 parts of a 1% aqueous solution of diphenyl-biguanide chlorohydrate are then added dropwise and the whole is stirred for some time. 33 parts of a red-sensitized silver chloride/silver bromide/gelatine emulsion that contains about 3 parts of silver in 100 parts of gelatine emulsion are then added. The whole is then diluted with 8 to 20 parts of water in order to obtain the degree of viscosity required.

10 milliliters of the mixture so obtained are cast onto a glass plate the dimensions of which are 13 centimeters x 18 centimeters and dried; the layer so prepared is then exposed under a positive master image and is then processed as follows:

(1) Hardening for 5 minutes in an aqueous formaldehyde solution of 4% strength.
(2) Washing in water for 5 minutes.
(3) Development for 6 minutes in a bath that contains, per liter of water, 50 grams of sodium sulfate, 0.2 gram of 1-phenyl-3-pyrazolidone, 6 grams of hydroquinone, 35 grams of anhydrous sodium carbonate, 4 grams of potassium bromide and 0.3 gram of benztriazole.
(4) Washing in water for 5 minutes.
(5) Fixation for 6 minutes in a solution of 200 grams of sodium thiosulfate and 20 grams of potassium metabisulfite in 1000 milliliters of water.
(6) Washing in water for 5 minutes.
(7) Bleaching of the color image for 3 to 12 minutes with a solution containing, per liter of water, 50 to 80 grams of potassium bromide, 40 to 80 grams of thiourea, 35 to 80 grams of sulfuric acid of 30% strength and, if desired, 0.001 gram of aminophenazine.
(8) Washing in water for 10 minutes.
(9) Bleaching the residual silver for 5 minutes with a solution containing 60 grams of copper sulfate, 80 grams of potassium bromide and 15 milliliters of hydrochloric acid of 30% strength in 1 liter of water.
(10) Washing in water for 5 minutes.
(11) Fixation for 5 minutes as described under (5).
(12) Washing in water for 5 minutes.

After drying, there is obtained a blue position image. The fastness to light of the said reversal image can be substantially improved by treating it for 5 to 10 minutes in copper sulfate bath of 2 to 5% strength or a copper acetate bath of 2 to 4% strength, washing it with water for 5 to 10 minutes and then drying.

The greenish blue layer has a maximum density of 1.8 to 2, and its absorption maximum is between 650 and 660 mµ. A layer of this kind can be used as a component layer in three-color material.

Similar results are obtained when, instead of dyestuff No. 1 of Table I there is used the dyestuff of the Formula 7 or any one of the dyestuffs Nos. 2 to 17 in the table or one of the dyestuffs whose preparation is described under B or C.

*Example 2*

10 parts of a 1% solution of dyestuff No. 3 of the table are added to 33 parts of an aqueous 10% gelatine solution having a temperature of 40° C., and the mixture is stirred.

5 parts of an aqueous copper sulfate solution that contains 5 parts of crystallized copper sulfate in 1000 parts of water, are added dropwise while stirring.

The whole is then stirred for 15 minutes at 35 to 40° C.

33 parts of a silver chloride/silver bromide/gelatine emulsion that may be red-sensitized are then added. Its silver content should be 3 to 4 parts in 100 parts of emulsion. The mixture is adjusted to the desired viscosity with 15 to 25 parts of water or water that contains a dispersing agent, for example, saponin. For tests purposes, 10 milliliters of this mixture are cast on a glass plate having the dimensions 13 centimeters x 18 centimeters, dried and exposed. The plate is then treated with the various baths in the manner described in Example 1.

When after-coppering is finished there is obtained a cyan positive image possessing a high fastness to light.

The absorption maximum is at 680 mμ.

Dyestuff No. 2 can also be used instead of dyestuff No. 3.

Instead of aftertreating the bleached image with a copper sulfate solution, it can be aftertreated with a nickel salt, for example, with nickel sulfate. The bleached out image that has been washed with water is treated with an aqueous solution of nickel sulfate of 1 to 3% strength, washed with water for 5 to 10 minutes and then again for 5 minutes, and then dried. A blue, fast-to-light positive image is obtained.

*Example 3*

10 parts of an aqueous 1% solution of dyestuff No. 1 are added to 33 parts of an aqueous 10% gelatine solution and the mixture is stirred.

5 parts of an aqueous solution of copper sulfate and a reaction product of ethylene diamine and formaldehyde are added dropwise and the whole is stirred.

As described in Example 1, 33 parts of a silver chloride/silver bromide/gelatine solution are added and the whole is stirred for 15 minutes in 19 parts of water. The operations in respect of sample-taking, exposure, development and bleaching are then carried out in the manner described in Example 1. When the positive image has been coppered it is greenish blue and possesses a high degree of light fastness.

*Example 4*

1 gram of the copper compound of the dyestuff of the formula

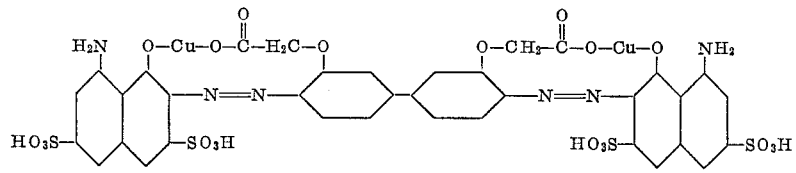

that has been obtained in the usual manner from a copper-free dyestuff by a treatment with copper sulfate in aqueous solution, is ground to a very fine dispersion with 1 to 3 parts of dimethylformamide and then dissolved in 100 parts of water. The solution so obtained is added to 330 parts of a 6% gelatine solution having a temperature of 50° C. and then homogenized. 330 parts of a red-sensitized silver halide/gelatine emulsion that contains about 9 parts of silver are then added. The desired viscosity is obtained by the addition of water and assistants.

For test purposes, 10 milliliters of this mixture are cast on to a glass plate having the dimensions 13 centimeters x 18 centimeters, dried, and then exposed under a positive master image. The layer is then further treated in the manner described in Example 1 under 1 to 12

A greenish blue image possessing a high degree of light fastness is obtained.

What is claimed is:

1. Photographic material for the silver dyestuff bleaching process that contains on a support a silver halide emulsion layer having at least one dyestuff of the formula $$R_1—N=N—D—N=N—R_2$$

in which D represents a diphenyl radical bound to the azo groups in 4-position and 4'-position, which radical contains a carboxy-alkoxy group in 3-position and in 3'-position, $R_1$ represents the radical of a 1-amino-8-hydroxynaphthalene sulfonic acid bound to the azo group in 7-position and $R_2$ represents a hydroxynaphthalene radical bound to the azo group in a position vicinal to the hydroxyl group, the dyestuff molecule containing at least 2 sulfonic acid groups.

2. Photographic material for the silver dyestuff bleaching process that contains on a support a silver halide emulsion layer having at least one complex heavy metal compound of a dyestuff of claim 1.

3. Photographic material for the silver dyestuff bleaching process that contains on a support a silver halide emulsion layer having at least one dyestuff of the formula

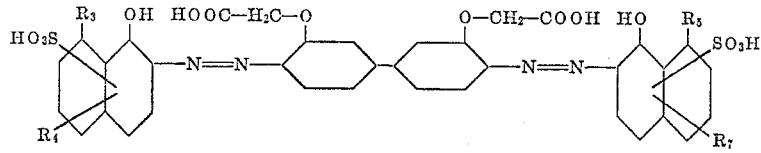

in which $R_3$ represents a member selected from the group consisting of an $H_2N—$ group, a phenylamino group and an acylamino group, $R_5$ represents a member selected from the group consisting of a hydrogen atom, an $H_2N—$ group, a phenylamino group, an acylamino group, a hydroxyl group and an alkoxy group, and $R_4$ and $R_7$ each represents a member selected from the group consisting of a hydrogen atom and a sulfonic acid group.

4. Photographic material for the silver dyestuff bleaching process that contains on a support a silver halide emulsion layer having at least one complex copper compound of a dyestuff of claim 3.

5. Photographic material for the silver dyestuff bleaching process that contains on a support a silver halide emulsion layer having at least one dyestuff of the formula

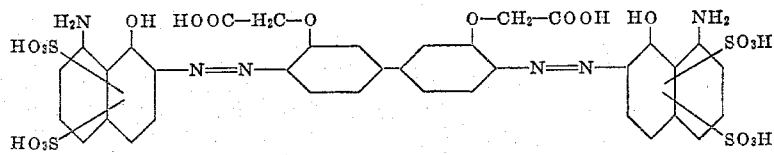

6. Photographic material for the silver dyestuff bleaching process that contains on a support a silver halide emulsion layer containing the dyestuff of the formula

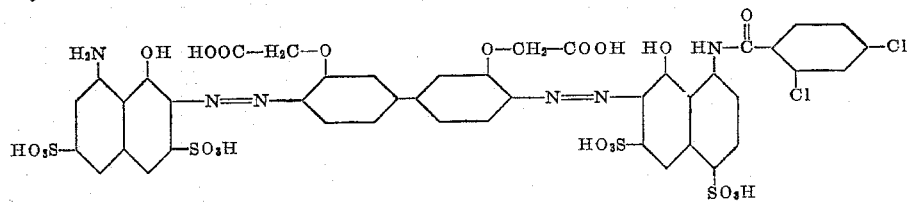

7. Photographic material for the silver dyestuff bleaching process that contains on a support a silver halide emulsion layer containing the dyestuff of the formula

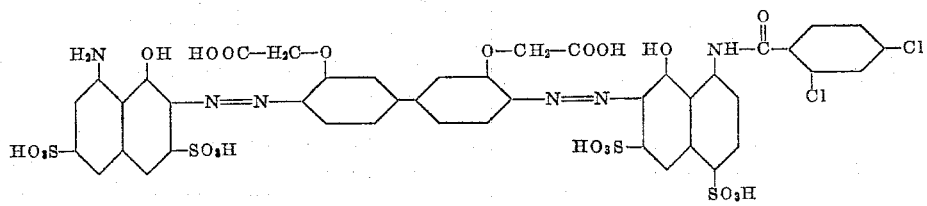

8. Photographic material for the silver dyestuff bleaching process that contains on a support a silver halide emulsion layer containing the dyestuff of the formula

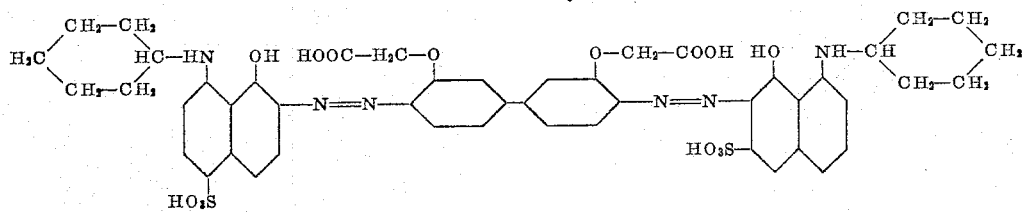

References Cited by the Examiner

UNITED STATES PATENTS

| | | | |
|---|---|---|---|
| 2,294,892 | 9/1942 | Carroll et al. | 96—99 |
| 2,612,448 | 9/1952 | Gaspar et al. | 96—99 |
| 3,211,556 | 10/1965 | Anderau | 96—20 |

FOREIGN PATENTS 899,758  6/1962  Great Britain.

J. TRAVIS BROWN, *Acting Primary Examiner.*